(12) United States Patent
Irgum et al.

(10) Patent No.: US 9,458,549 B2
(45) Date of Patent: Oct. 4, 2016

(54) METHOD FOR MANUFACTURING OF AN OBJECT HAVING PHOSPHORESCENT PROPERTIES

(75) Inventors: Knut Irgum, Bullmark (SE); Erika Wikberg, Umeå (SE)

(73) Assignee: Alusera AB, Göteborg (SE)

( * ) Notice: Subject to any disclaimer, the term of this patent is extended or adjusted under 35 U.S.C. 154(b) by 473 days.

(21) Appl. No.: 14/111,529

(22) PCT Filed: Apr. 12, 2011

(86) PCT No.: PCT/SE2011/050445
§ 371 (c)(1),
(2), (4) Date: Jan. 24, 2014

(87) PCT Pub. No.: WO2012/141626
PCT Pub. Date: Oct. 18, 2012

(65) Prior Publication Data
US 2014/0151234 A1 Jun. 5, 2014

(51) Int. Cl.
*C25D 11/18* (2006.01)
*C25D 11/24* (2006.01)
*C09K 11/77* (2006.01)

(52) U.S. Cl.
CPC ........... *C25D 11/18* (2013.01); *C09K 11/7734* (2013.01); *C25D 11/24* (2013.01)

(58) Field of Classification Search
CPC .................................................... C25D 11/18
USPC ......... 205/170–173, 202–204, 209, 232–332
See application file for complete search history.

(56) References Cited

U.S. PATENT DOCUMENTS

| 2002/0160188 A1 | 10/2002 | Tam et al. | |
| 2004/0011659 A1* | 1/2004 | Srinivasan | C25D 9/06 205/320 |
| 2006/0016690 A1* | 1/2006 | Ostrovsky | C25D 11/36 205/104 |

FOREIGN PATENT DOCUMENTS

| CA | 2005560 | 6/1990 |
| JP | 60-205989 A | 10/1985 |
| JP | 2001-152392 A | 6/2001 |
| JP | 2005-120421 A | 5/2005 |
| JP | 2009-270004 A | 11/2009 |
| WO | 01/51681 A2 | 7/2001 |

OTHER PUBLICATIONS

Machine translation of JP 2005-120421 of Naito, H. Published May 12, 2005.*
International Search Report received for PCT Patent Application No. PCT/SE2011/050445, mailed on Dec. 15, 2011, 5 pages.
Azevedo et al, "Photoluminescence Characteristics of Rare Earth-Doped Nanoporous Aluminum Oxide", Applied Surface Science, vol. 234, 2004, pp. 457-461.
Gaponenkoa et al., "Room-Temperature Photoluminescence from Porous Anodic Alumina Films with Embedded Terbium and Europium Species", Materials Letter, vol. 63, 2009, pp. 621-624.
Tesfalidet et al., "Determination of Hydrogen Radicals in Analytical Flames Using Electron Spin Resonance Spectroscopy Applied to Direct Investigations of Flame-Based Atomization Units for Hydride Generation Atomic Absorption Spectrometry", Anal. Chem., vol. 71, 1999, pp. 1225-1231.
Wernick et al., "The Surface Treatment and Finishing of Aluminium and its Alloys", Chapter 6, "Anodizing of Aluminium: General Notes and Theory", Fifth Edition, vol. 1, Finishing Publications Ltd., 1987, 93 pages.
Wood, See, "Charcoal", "Chelating Agents", Kirk-Othmer Encyclopedia of Chemical Technology, 4th Edition, vol. 5, Chapter 20, 2004, pp. 381-396.
International Preliminary Report on Patentability received for PCT Patent Application No. PCT/SE2011/050445, mailed on Oct. 24, 2013, 8 pages.
International Written Opinion received for PCT Patent Application No. PCT/SE2011/050445, mailed on Dec. 15, 2011, 6 pages.
Extended European Search Report (includes Supplementary European Search Report and Search Opinion) received for European Patent Application No. 11863548.1, mailed on Feb. 17, 2015, 7 pages.

* cited by examiner

*Primary Examiner* — Nicholas A Smith
*Assistant Examiner* — Brian W Cohen
(74) *Attorney, Agent, or Firm* — Morrison & Foerster LLP

(57) ABSTRACT

The invention concerns a method for manufacturing of an object having phosphorescent properties, comprising the steps of providing an object having a surface made from aluminum or from an aluminum-based alloy and forming a layer of porous aluminum (hydr)oxide at said surface. The invention is characterized in that the method comprises the step of contacting the layer of porous aluminum (hydr)oxide with one or several solutions containing metal dopant ions such as to allow the metal dopant ions to bind to the layer of porous aluminum (hydr)oxide, wherein at least one of said solutions contains ions of at least one element selected from a first group consisting of calcium (Ca), magnesium (Mg), strontium (Sr) and barium (Ba), and wherein at least one of said solutions contains ions of europium (Eu). The invention also concerns an object obtainable by the above method.

18 Claims, No Drawings

METHOD FOR MANUFACTURING OF AN OBJECT HAVING PHOSPHORESCENT PROPERTIES

CROSS REFERENCE TO RELATED APPLICATION

This application is a U.S. National Phase patent application of PCT/SE2011/050445, filed Apr. 12, 2011, which is hereby incorporated by reference in the present disclosure in its entirety.

TECHNICAL FIELD

This invention relates to a method for manufacturing of an object having phosphorescent properties. In particular, the invention relates to forming of a phosphorescent surface layer of an object made of aluminium or aluminium-based alloys. The invention also relates to an object obtainable by such a method.

BACKGROUND OF THE INVENTION

Objects with surfaces having luminous afterglow (phosphorescent) properties are useful as indicators of, for instance, emergency equipment where they can be used to indicate escape routes and location of critical equipment in darkness, such as in the event of a power failure in public buildings or during an emergency situation on a ship or an aircraft. Introduction of phosphorescent properties can also be used for gadgets, toys etc.

Phosphorescent materials are typically solid, crystalline materials and their production usually involves mixing, sintering and grinding to form a powdery material. CN 1053807 and U.S. Pat. No. 5,424,006 teach that efficient phosphorescence can be achieved by the use of e.g. aluminium-strontium oxide doped with europium and dysprosium.

A phosphorescent surface is conventionally produced by forming a paint containing phosphorescent particulate material and applying the paint onto the surface of an object, such as an extruded aluminium profile. A problem with this technique is that the particle size of the phosphorescent material must be kept relatively large to maintain the phosphorescent properties, which means that surfaces treated with such paints become rough with accumulation of dirt and dust particles and a decrease in the luminance capacity over time as a result. Another problem is that the luminous coating is affected by wear and tear and may gradually be worn down. Still another problem is that the painting process can be rather laborious and time-consuming. In addition, only a fraction of the rare earth metal oxides added in the manufacturing process of the long afterglow phosphorescence pigments contribute to the final luminescence of the product, resulting in high production costs.

CA 2005560 discloses a process where an organic luminescent substance is deposited in the pores of an aluminium oxide layer. This process may reduce the problems related to the painting process but the durability of the capacity to store and emit light is uncertain since luminescent organic substances are likely to decompose with time.

Accordingly, there is a need for improvements in the field of providing a phosphorescent surface onto objects for the purpose of, for instance, indicating escape routes and location of critical equipment in darkness.

SUMMARY OF THE INVENTION

An objective of this invention is to provide a process for producing objects with long lasting afterglow properties, typically objects made of aluminium or its alloys, by forming a phosphorescent phase directly in the surface layer of the object, making the luminescent layer an integral part of the metal surface, which process has the potential of decreasing the manufacturing costs significantly compared to conventional processes and where the phosphorescent objects produced exhibit improved mechanical durability and corrosion resistance compared to the objects produced by the previously known technique. This objective is achieved by the method and device defined by the technical features contained in independent claims 1, 20 and 21. The dependent claims contain advantageous embodiments, further developments, and variants of the invention.

The invention concerns a method for manufacturing of an object having phosphorescent properties, comprising the steps of: providing an object having a surface made from aluminium or from an aluminium-based alloy and forming a layer of porous aluminium (hydr)oxide at said surface.

The invention is characterized in that the method comprises the step of contacting the layer of porous aluminium (hydr)oxide with one or several solutions containing metal dopant ions such as to allow the metal dopant ions to bind to the layer of porous aluminium (hydr)oxide, wherein at least one of said solutions contains ions of at least one element selected from a first group consisting of calcium (Ca), Magnesium (Mg), strontium (Sr) and barium (Ba), and wherein at least one of said solutions contains ions of europium (Eu).

The step of forming a layer of porous aluminium (hydr)oxide at the outer surface of, for instance, an aluminium body is well known as such. The term (hydr)oxide aluminium layer is used to indicate that the layer is a form of hydrated aluminium oxide.

Treatment with the abovementioned metal dopant ions can take place in direct connection to the step of forming the hydrous aluminium surface layer, for instance directly in an anodization bath, or in one or more separate steps following the formation of the porous layer, prior to sealing the porous surface in a later step.

When the layer of porous aluminium (hydr)oxide is contacted with the one or several dopant solutions, which can be a single solution containing all three types of metal ions, the ions will bind to the porous alumina by various processes, such as surface adsorption and ion exchange. This way phosphorescent $MAl_2O_4$-type material can be produced directly in the porous alumina surface layer of the object. Typically, this object is an aluminium (based) object where the porous surface layer has been formed by subjecting the object to an anodization process, which, as such, is a known process in the field of producing/processing aluminium (based) items. Thus, the luminous properties can become an integral part of an anodized surface of the aluminium (based) object.

An advantageous effect of the inventive method is that it reduces the consumption of costly raw material containing rare earth metals compared to the conventional process of producing particulate phosphors and formulating paints made from them. A further advantageous effect is that it eliminates the need to paint the object in a separate process. A further advantageous effect is that the surface becomes durable and scratch-proof, which extends the lifetime of the product and also increases the possibilities to use luminescent objects in locations where wear is considerable, such as floors, on steps in stairways, as door handles etc. A further advantageous effect is that the luminescent surface is not only durable but also smooth which makes it easy to clean.

In an embodiment of the invention at least one of said solutions has an initial concentration of at least 0.001 M, preferably at least 0.01 M, more preferably at least 0.1 M, of the ions of the first group.

In an embodiment of the invention at least one of said solutions has an initial concentration of at least $10^{-9}$ M, preferably at least $10^{-8}$ M, more preferably at least $10^{-7}$ M, of the europium ions.

In an embodiment of the invention at least one of said solutions contains ions of at least one element selected from a second group consisting of lanthanum (La), cerium (Ce), praseodymium (Pr), neodymium (Nd), samarium (Sm), gadolinium (Gd), terbium (Tb), dysprosium (Dy), holmium (Ho), erbium (Er), thulium (Tm), ytterbium (Yb), lutetium (Lu), tin (Sn) and bismuth (Bi). Preferably, at least one of said solutions has an initial concentration of at least $10^{-9}$ M, preferably at least $10^{-8}$ M, more preferably at least $10^{-7}$ M, of the ions of the second group. Phosphorescent properties may be achieved without such co-activator ions, but the addition of ions from the second group extends the duration of the light emission significantly. Sr and Dy are of particular interest because strontium aluminates doped with Eu and Dy exhibit exceptional afterglow durability compared to other phosphorescent aluminates.

In an embodiment of the invention the method comprises the step of sealing the layer of porous aluminium (hydr)oxide, which sealing step is carried out after the step of contacting the layer of porous aluminium oxide with the one or several metal ion solutions.

In an embodiment of the invention the method comprises the step of reducing at least a part of the europium ions from a trivalent state to a divalent state.

In an embodiment of the invention the one or several metal ion solutions used in the contacting step has a pH of at least 7. Preferably, the pH is in the range 8-10.

In an embodiment of the invention the one or several metal ion solutions used in the contacting step contains a chelating agent.

In an embodiment of the invention the layer of porous aluminium oxide is contacted with a mixed solution containing ions of Eu as well as ions of the first and/or the second group. Preferably, the mixed solution contains ions of europium (Eu) at an initial concentration of at least 0.0001%, preferably at least 0.001%, of that of the ions of the first group. Preferably, the mixed solution contains ions of the second group at an initial concentration of at least 0.0001%, preferably at least 0.001%, of that of the ions of the first group.

In an embodiment of the invention the object as a whole is substantially made of aluminium or an aluminium based alloy.

In an embodiment of the invention the step of forming the layer of porous aluminium (hydr)oxide is carried out using an anodic oxidation process.

In an embodiment of the invention the anodic oxidation process is carried out using an electrolyte that also forms the mixed solution.

In an embodiment of the invention the method comprises the step of washing the layer of porous aluminium (hydr)oxide before contacting it with the one or several metal ion solutions.

In an embodiment of the invention the step of reducing europium ions is carried out after the step of contacting the layer of porous aluminium (hydr)oxide with the one or several metal ion solutions such as to reduce europium ions that have been bound to the layer of porous aluminium oxide during the contacting step.

In an embodiment of the invention the step of reducing europium ions is carried out after the step of sealing the layer of porous aluminium oxide.

The invention also concerns an object having phosphorescent properties, wherein the object is obtainable by a method according to the above.

The invention also concerns an object having phosphorescent properties, wherein the object comprises phosphorescent material of the type $MAl_2O_4$ where M is calcium (Ca), magnesium (Mg), strontium (Sr) or barium (Ba), wherein the phosphorescent material is incorporated in a surface layer that forms an integral part of the object. In an embodiment, the phosphorescent material is located in pores in the surface layer, which pores are sealed from contact with the surrounding environment. In a further embodiment, the object is made of aluminium or an aluminium based alloy.

DESCRIPTION OF EXAMPLE EMBODIMENTS OF THE INVENTION

This section describes how objects made from, or covered with, aluminium or its alloys can be treated by various chemical processes to give the objects long lasting photoluminescent properties, so called long afterglow phosphorescence. This description deals with two different approaches to obtain aluminium surfaces with such properties. Both approaches involve electrochemical treatment of an aluminium object to create a porous aluminium (hydr)oxide film on the aluminium surface, a common operation in the aluminium processing industry denoted as anodization. Anodization of aluminium produces a very uniform structure of porous aluminium (hydr)oxide on the surface. The idea of the invention is to modify this or similar structures to incorporate phosphorescent species into the surface layer of the anodized metal. In the present invention, the phosphorescent $MAl_2O_4$ type material is produced directly in the surface layer of anodized aluminium objects, which presents several attractive features to the material.

Anodization of aluminium objects is typically performed by immersing the object in an acidic electrolyte (containing in the typically case sulfuric, phosphoric, or oxalic acid) and subjecting the object to electrochemical oxidation by applying a DC current with the object undergoing treatment being connected as the anode to the positive output of the current source and another metallic electrode acting as cathode. This results in the formation of a porous layer on the surface of the object being treated at the anode, consisting mainly or solely of hydrated aluminium oxide. The surface layer of high aluminium alloys treated in this manner can be made to consist of a regularly arranged array of hexagonal cells of aluminium (hydr)oxide with a central pore protruding down to the aluminium surface, where a thin barrier layer of aluminium oxide separates it from the aluminium metal.

When current is applied in the circuit, the following reactions are known to take place:

Anode $2Al + 3H_2O \rightarrow Al_2O_3 + 6H^+ + 6e^-$

Cathode $6H^+ + 6e^- \rightarrow 3H_2(g)$

Overall reaction $2Al + 3H_2O \rightarrow Al_2O_3 + 3H_2(g)$

The anodization process is, as such, a known process and is typically run in a dilute acid electrolyte, commonly sulfuric acid. As the aluminium oxide layer gradually builds up at the surface, the acid simultaneously causes dissolution of the film. This results in the typical honey-comb porous structure observed in acid electrolytes. Film growth continues until a certain limiting thickness, where the rates of film formation and dissolution are equal. The choice of acid affects the morphology of the aluminium (hydr)oxide (commonly denoted anodic alumina) film in terms of porosity, pore diameter, cell size etc. The thick layer of hydrated oxide formed on anodized aluminium makes the material very corrosion resistant after sealing and is commonly used to process aluminium objects. In the present invention the pores are contacted with a solution containing metal ions of the type used in the rare earth doped $MAl_2O_4$ type phosphor which thereby become bonded to the porous film. This way an aluminium surface with inherent phosphorescent properties can be produced.

An electrolyte consisting of 20% (w/w) sulfuric acid can be used to anodize aluminium objects. Other acids, preferably acids with at least two protons, such as phosphoric acid, oxalic acid, or chromic acid, may be used instead.

There are several parameters that may be varied in the anodization process, such as voltage, current, temperature, agitation, acid concentration, which can all be used to adapt the porous layer, e.g. its depth, pore density and size. Further information can be found in e.g. "The surface treatment and finishing of aluminium and its alloys", Simon Wernick (ASM International, 5:th Ed. 1987).

This description focuses on production of a phosphorescent material of the type $SrAl_2O_4$:Eu, Dy in the pore structure of anodized aluminium surfaces. The optimal concentration of activator and co-activator in the strontium aluminate phase formed in the surface layer differs depending on the composition of the base aluminate material, and also on the choice of co-activator metal. A molar ratio of approximately 0.5-2% Eu and Dy in relation to the Sr-content may be considered as a general guideline.

It should be noted that strontium (Sr) may be replaced, in part or in full, by any combination of calcium (Ca), magnesium (Mg) and/or barium (Ba). Further, dysprosium (Dy) may be replaced, in part or in full, by any combination of lanthanum (La), cerium (Ce), praseodymium (Pr), neodymium (Nd), samarium (Sm), gadolinium (Gd), terbium (Tb), holmium (Ho), erbium (Er), thulium (Tm), ytterbium (Yb), lutetium (Lu), tin (Sn) and/or bismuth (Bi).

Sr and Dy are of particular interest because strontium aluminates doped with Eu and Dy exhibit exceptional afterglow durability compared to other phosphorescent aluminates. Phosphorescent properties may be achieved without co-activator ions, but the addition of $Dy^{3+}$ extends the duration of the light emission significantly.

Replacement of Sr is preferably done by using Ca or Ba. Replacement of Dy is preferably done by using Nd.

In a first embodiment the porous aluminium oxide is doped with strontium, europium and dysprosium ions directly during anodization. That is, the electrolyte forms a solution that contains the dopant metal ions so that the porous layer is continuously contacted with dopant metal ions during its formation. This is a simple way to incorporate the dopant ions throughout the entire alumina layer structure while it is produced. This embodiment is generally not suitable if sulfuric acid is used as the anodization electrolyte because of the very poor solubility of strontium sulfate in dilute sulfuric acid, which results in a low concentration of strontium ions available for incorporation in the porous layer. This embodiment can, however, be used by substituting sulfuric acid for another acid in the anodization step, in which acid strontium ions are sufficiently soluble.

In a second embodiment, the metal ions are incorporated in the porous surface by first subjecting a freshly anodized surface to a washing step in purified water, possibly containing Sr and/or Ba ions, then immersing it in an aqueous solution containing the dopant cations (Sr, Eu, Dy). The doping solution is preferably prepared by dissolving appropriate amounts of the nitrate salts of the respective metals in water, but it is also possible to use other suitable soluble salts or any other forms of the metals capable of producing an aqueous metal ion solution. Of course, the porous surface may be contacted with several solutions, each of which contains only one or two of the three different types of ions. This may be used to increase the control over the process of binding the ions to the surface. However, the production process as a whole is likely to be simplified and sped up by including all relevant metal ions in the same solution.

To reduce the charge barrier between the anodized surface and the metal cations, and to achieve a sufficient mobility of metal ions in the solution, the pH of the doping solution should be adjusted to at least above 7, preferably in the range between 8 and 10. Values of pH also up to around 11 and possibly beyond may be preferable depending on the application. Generally, the pH should be lower than 11. At very high pH values the aluminium oxide starts to dissolve, which thus damages the oxide layer and reduces the doping efficiency. As a general rule, the pH value in the doping solution should be chosen with the objective to optimize the binding capacity of the primary dopant ion (strontium ions or the alternative ions from the first group) to the aluminium (hydr)oxide surface.

In order to prevent precipitation of metal hydroxides under the slight alkaline conditions and to gain better control over the doping process, the addition of a metal-chelating agent to the solution is preferable. The chelating agent may be chosen from a selection of compounds belonging to either of the groups aminocarboxylic acids, polyphosphates, 1,3-diketones, hydrocarboxylic acids, polyamines, aminoalcohols, aromatic heterocyclic bases, hydroxybenzoic acids, aminophenols, oximes, tetrapyrroles, sulfonic acids, sulfinic acids, phosphonic acids, or compounds containing combinations of such groups. Compounds such as those mentioned are interchangeable in common use as metal-chelating (Kirk-Othmer Encyclopedia of Chemical Technology, 4th Edition). A non-exhaustive list of suitable chelating agents is ethylenediaminetetraacetic acid (EDTA), diethylene triamine pentaacetic acid (DTPA), ethylenediamine-N,N'-bis (2-hydroxyphenylacetic acid) (EDDHA), N,N'-bis(hydroxybenzyl)ethylenediamine-N,N'-diacetic acid (HBED), N-(2-hydroxy)ethylenediaminetriacetic acid (HEDTA), salicylic acid (SA), 8-hydroxyquinoline (HQN), various substituted 3-hydroxy-4-pyridinones, and mixtures thereof.

Following the step of producing the layer of porous aluminium (hydr)oxide according to the second embodiment, the surface of the aluminium object is washed/cleaned by, in this example, immersing the object in deionized water to remove excess sulfate ions (or anions corresponding to the acid used if different from sulfuric acid) incorporated in the layer during the anodization process. An alternative cleaning procedure is to immerse the freshly anodized object in a solution of calcium, strontium or barium nitrate. The low solubility of $CaSO_4/SrSO_4/BaSO_4$ can enhance the removal of sulfate ions from the hydrated alumina layer by forming an insoluble salt with strontium or barium ions in solution. Such treatment is also likely to result in the formation of a film of $CaSO_4/SrSO_4/BaSO_4$ on the hydrated oxide surface which enhances the incorporation of metal ions from the first group and subsequently facilitates the adsorption of trivalent europium and polyvalent ions from the second group.

The anodized surface may be further treated prior to the step of doping the surface. For instance, the pores can be widened by using, e.g., phosphoric acid and/or a second anodization step can be carried out to adjust the structure of the pores on the surface, for instance by following procedures that are well known in prior art.

In a typical doping procedure of the invention according to the second embodiment, strontium nitrate $(Sr(NO_3)_2)$ is dissolved in purified water at a concentration ranging from 0.1 M to 3 M. Europium nitrate $(Eu(NO_3)_3)$ and dysprosium nitrate $(Dy(NO_3)_3)$ are added to the solution. The molar ratio of europium and dysprosium ions is typically between 0.001% and 1% with respect to the strontium ion concentration. EDTA disodium salt dihydrate is added to the solution to an EDTA concentration between 50 mM and 0.7 M. The pH is thereafter adjusted to a value between 8.5 to 10 by addition of a solution of sodium hydroxide under stirring. Other bases may be used.

The objective of the doping step is to establish a strontium aluminate phase containing suitable amounts of activator and co-activator metals on the surface of the porous (hydr) oxide. Generally, the adsorption efficiency of rare earth metal ions is much higher than that of strontium, and the initial concentrations of these ions in the solution must therefore be significantly lower than the strontium concentration, at least if a thin film of $SrSO_4$ has not been successfully formed on the pore surface during the rinsing step with a soluble strontium salt, as disclosed above. The type and concentration of chelating agent may be adjusted to obtain even better control of the adsorption of the rare earth metal ions.

In general, the luminescence efficiency is proportional to the amount of phosphorescent material in the surface layer. It is therefore desirable to obtain a high degree of ion adsorption during the doping step. The concentration and kind(s) of chelating agent(s) required to obtain optimal doping of the surface depends both on the total ion concentration, the concentration and type of activator and co-activator ions, and the choice and concentration of chelating agent(s).

In general, the concentration in solution of ions from the first group should be as high as possible and the concentration of activator and co-activator ions should normally be between approximately 0.001% and 1% with respect to the ions of the first group, depending on the chosen pH and the concentration and type of chelating agent(s) used. The concentration of chelating agent(s) should furthermore be sufficiently high to prevent precipitation of metal hydroxide in the doping bath.

If an exhaustive rinsing step in water is applied prior to doping, the anodized aluminium object is cleaned from excess sulfate ions and protons adsorbed during the anodization process by immersing it in deionized water for approximately 1 hour under gentle stirring. The rinsing step in water could also be brief, lasting from a few seconds to minutes, aiming at removing excess acid from the anodization bath from the outermost surface only and leaving a certain amount of acid anions inside the porous layer, followed by treatment in a solution containing one or several soluble salt(s) of metal(s) from the first group, with the intention to promote the formation of a $CaSO_4/SrSO_4/BaSO_4$ film on the hydrated oxide surface of precipitate, as disclosed above. Doping typically takes place by immersing the cleaned anodized object in the doping solution at ambient temperature for several hours, typically between 12 and 24 hours. The time needed depends, among other factors, on the actual temperature and the degree of agitation. After doping, the object is rinsed in purified water and may be air-dried.

During doping, metal ions from the doping solution are adsorbed to the surface of the pore walls. Two alternative ways of adsorption are viable, either ion exchange with $Al^{3+}$ ions from the alumina structure, or by chemical bonding to the surface oxygen atoms at the pore wall surface. Both adsorption modes may occur simultaneously. Possibly, additional bonding reactions may be involved. The composition of the doping solution, both in terms of total ion concentration as well as molar ratio of the included ion species, affects the uptake ratio of the different metal ions in the porous surface layer and may thus be used as means for controlling the composition of the final surface layer. The uptake of ions on/in the anodic alumina layer may also be affected by the type and concentration of chelating agent(s). These parameters can thus be adapted to the particular application.

The relative ion concentrations in the objects may be controlled by adjusting the composition of the doping bath, which is essential in order to obtain a material with optimal phosphorescent properties. Materials known from prior art (U.S. Pat. No. 5,424,006) to yield afterglow properties are formed in a composition range $SrAl_2O_4$: $Eu_x$, $Dy_y$, where x and y may vary from 0.0001 to 10. It should be realized that the doping process will result in layers with spatially varying concentrations of dopant ions, with gradients existing both with respect to the pore depth and the depth of the pore surface layer; the process of optimizing the concentrations of metal ion(s) and chelating agent(s) in the dopant solution therefore aims to maximize the spatial yield of phases with the desired 1:2 stoichiometry of M:Al (where M=Sr, Ca, Mg or Ba) and optimal amounts of Eu and Dy (or an alternative co-dopant) for the creation of a luminescent layer with high yield of photoactive material. It is generally not possible to prepare a doped aluminium oxide surface with this stoichiometry by doping it directly in solution with these ions added at the desired molar ratio in the final product, since there are large differences in both the mobilities of the dopant ions and their affinity for the aluminium oxide surface.

The total amount of strontium ions adsorbed increases with the concentration of strontium in the doping solution. The adsorption of rare earth ions mainly depends on the concentration in the doping solution, but the concentration of chelating agent(s) is also of importance. Very high solution concentrations of chelating agent(s) may be difficult to handle. The adsorption of strontium can be increased by using very concentrated doping solutions (up to around 3 M solutions of $Sr(NO_3)_2$ may be prepared). If the rare earth ions are contained in the same solution it should be arranged such that the rare earth ion adsorption can be controlled without increasing the concentration of chelating agent(s) too much.

The final phosphorescent properties thus depends on 1) The molar ratio of the adsorbed metal ions (affected mainly by doping solution composition, pH, and the concentration of chelating agent(s)), 2) The total amount of metal ions adsorbed to the surface (affected mainly by the total ion concentration in the doping solution, the doping time, and agitation during the doping step), and 3) The crystal structure and electronic structure of the formed metal aluminate material.

The mixed composition formed on the porous surface is a precursor to the crystalline material, which is subsequently formed in the combination of the subsequent steps, such as the sealing step. After the final treatment steps, parts of the doped alumina surface layer will acquire phosphorescent properties such as those described in U.S. Pat. No. 5,424,006. Maximum yield of material with optimal composition will be formed at a certain doping level along the pore wall axis. The phosphorescent groups will mainly be located in regions of the sealed and annealed oxide layer that originate from hydrated oxide exposed at the pore wall surfaces. Although the finished oxide layer appears translucently off-white in color, the thickness of the anodized surface layer may be adjusted during the anodization step if significant light absorption occurs in the luminescent material itself.

At some point in the general process it is necessary to close the pores of the anodized surface, a process known as sealing. Sealing is a well known process as such and is typically done by thermal aqueous treatment of anodized objects in water. This step renders a hard and corrosion resistant anodized oxide surface that can tolerate wear. Sealing also encapsulates the substances added to the (walls of the) pores. During the sealing the hydrated alumina precipitates at the pore walls and outside of the film. The gel further condensates to form pseudo-boehmite, followed by recrystallization to form boehmite AlO(OH). Since the boehmite layer is more voluminous than the hydrated alumina, the pores are thus closed.

Cold sealing can be achieved by adding various chemical agents to water, such as nickel and cobalt salts, ammonium acetate or triethanolamine.

Sealing may be done either before or after reduction of $Eu^{3+}$ ions. Generally, it is preferable to seal the surface before any reduction step involving wet treatment to avoid loss of the dopant ions.

Conventional thermal sealing of the object by submersion directly in boiling water is not suitable since it results in extensive leakage of metal ions from the surface. Instead the surface is preferably sealed by boiling it directly in the doping solution, in order to maintain the activity of the dopants. This eliminates the formation of a concentration gradient along the pore axis, which would otherwise cause leakage of dopants. Alternatively, the surface may be sealed by exposing it to dry steam. In this procedure the object is preferably heated to a temperature which is at least 5° C., preferably between 5 and 50° C., above the dew point of saturated steam under the particular treatment conditions. Maintaining the temperature of the treated object above the dew point prevents condensation of water from the steam, which in turn reduces the risk of leakage of dopant ions from the material surface by solvation, liquid phase diffusion, and run-off drainage.

In order to achieve a long afterglow phosphor that emits green-blue light, the invention makes use of a reduction step as described in e.g. U.S. Pat. No. 5,424,006 where the $Eu^{3+}$ ions in are partly or fully reduced to $Eu^{2+}$. In the manufacturing process of conventional $MAl_2O_4$ type pigments, the reduction is achieved by high temperature (1100-1400° C.) calcination in a reducing atmosphere.

However, in the process described here annealing/calcination of the surface layer cannot be performed at temperatures exceeding around 400-500° C. since the base aluminium metal cannot withstand higher temperatures without deformation or melting. The reduction of $Eu^{3+}$ to $Eu^{2+}$ must therefore be accomplished in a different way. Several alternatives are possible:

Electrochemical reduction: By connecting the anodized object as cathode and applying a combination of an AC and DC current with the object held at a slightly negative DC potential, it is possible to reduce parts or all of the adsorbed $Eu^{3+}$ ions through the electrochemical reaction: $Eu^{3+}+e^- \rightarrow Eu^{2+}$. The electrochemical reduction described here can be performed directly in the doping bath.

Pyrolytic reduction by the aid of organic precursors: Reduction can also be achieved by adding one or more organic compound(s) to the doped surface. Addition should preferably be made after or in combination with the doping step and before or during the sealing step. Upon heating the doped object with organic precursor(s) added to temperatures between 200 and 600° C. in an inert atmosphere the organic precursor undergoes pyrolysis/combustion yielding hydrogen gas and other reducing species which promotes reduction of $Eu^{3+}$ ions in the surface layer.

Reduction by hydrothermal treatment: Complete or partial reduction of Eu3+ ions in phosphorescent material may be achieved by subjecting it to relatively mild hydrothermal treatment. The method is based on the fact that the substitution of $Sr^{2+}$ sites by $Eu^{3+}$ creates vacancy defects in the material. To maintain charge balance in the material, two $Eu^{3+}$ ions are needed to substitute three $Sr^{2+}$ ions. The electrons in the vacancy defects may then participate in the reduction of $Eu^{3+}$ ions during the hydrothermal treatment.

Chemical reducing agents: Common non-pyrophoric chemical reducing agents, such as for example $NaBH_4$, dithionite, hydrazine, ascorbic acid, Sn(II) salts, or zinc hydride, may be used to reduce the $Eu^{3+}$ ions before sealing the pores.

Treatment in a reducing flame: Yet another alternative reductive treatment for more massive objects is brief application of a fuel-rich (reducing) flame to the surface. Such treatment is possible due to the high thermal conductivity of aluminium, which transports heat away from the surface and prevents the material from melting, in spite of the flame causing a locally high temperature in the surface oxide layer. Reducing flames are known to be rich in atomic "nascent" hydrogen, a radical species that is an efficient reducing agent (S. Tesfalidet, G. Wikander, K. Irgum, Anal Chem., 1999, 71, 1225-1231).

The inventive method may include an annealing/low temperature calcination step. A high temperature treatment is normally required when phosphorescent pigments are prepared in the conventional manufacturing process. This is done to allow migration of the metal ions in the crystal lattice of aluminium oxide so that a suitable electronic configuration is formed. This step is optional in the inventive method, since for a given aluminium alloy, a properly conducted optimization of the doping technique described here results in a composition optimal for formation of efficient phosphorescent crystal clusters in a substantial part of the surface coating that originates from pore surfaces. However, a low temperature annealing step in an oven (below around 600 deg. C.) may still improve the phosphorescent properties of the material.

Although a layer of porous aluminium oxide can be formed at (a part of) the surface of various objects the object provided with a phosphorescent surface is typically a body substantially made of, or a body having an entire outer surface made of, aluminium or an aluminium-based alloy. Alloys particularly suitable for treatment according to the invention should be composed of aluminium at a level of at least 95%, preferably at least 99%, with the alloy components being magnesium, silicon, or zinc, most preferably magnesium and/or silicon, found in the 1000, 4000, 5000, 6000, and 7000 series of the International Alloy Designation System.

The term initial concentration refers to the concentration of metal ions in the solution at the beginning of the contacting step. If the available surface of the porous layer is large compared to the volume of the solution, the concentration of metal ions in the solution may decrease significantly during the contacting step.

The invention is not limited by the embodiments described above but can be modified in various ways within the scope of the claims. For instance, reduction of Eu may not be necessary or can at least be done to a lesser extent if the intensity and wavelength of the (reddish) light emitted by a larger fraction of trivalent Eu is considered to be appropriate and sufficient for the application.

The object provided with the phosphorescent surface does not necessarily have to be a body entirely made up of aluminium or an aluminium-based alloy; it is sufficient if its surface, i.e. at least a part of its entire surface, is made of aluminium or its alloys. Further, the layer of porous aluminium (hydr)oxide can be formed over only a part of the aluminium or aluminium-based surface.

The invention claimed is:

1. Method for manufacturing of an object having phosphorescent properties, comprising the steps of:
   providing an object having a surface made from aluminium or from an aluminium-based alloy,
   forming a layer of porous aluminium (hydr)oxide at said surface,
   contacting the layer of porous aluminium (hydr)oxide with one or several solutions containing metal dopant ions such as to allow the metal dopant ions to bind to the layer of porous aluminium (hydr)oxide,
   wherein at least one of said solutions contains ions of at least one element selected from a first group consisting of calcium (Ca), magnesium (Mg), strontium (Sr) and barium (Ba), and wherein at least one of said solutions contains ions of europium (Eu), and reducing at least a part of the europium ions from a trivalent state to a divalent state.

2. Method according to claim 1, wherein at least one of said solutions has an initial concentration of at least 0.001 M of the ions of the first group.

3. Method according to claim 1, wherein at least one of said solutions has an initial concentration of at least $10^{-9}$ M of the europium ions.

4. Method according to claim 1, wherein at least one of said solutions contains ions of at least one element selected from a second group consisting of lanthanum (La), cerium (Ce), praseodymium (Pr), neodymium (Nd), samarium (Sm), gadolinium (Gd), terbium (Tb), dysprosium (Dy), holmium (Ho), erbium (Er), thulium (Tm), ytterbium (Yb), lutetium (Lu), tin (Sn) and bismuth (Bi).

5. Method according to claim 4, wherein at least one of said solutions has an initial concentration of at least $10^{-9}$ M of the ions of the second group.

6. Method according to claim 1, further comprising:
   sealing the layer of porous aluminium (hydr)oxide, wherein sealing step is carried out after the step of contacting the layer of porous aluminium oxide with the one or several metal ion solutions.

7. Method according to claim 1, wherein the one or several metal ion solutions used in the contacting step has a pH of at least 7.

8. Method according to claim 7, wherein the pH is in the range 8-10.

9. Method according to claim 1, wherein the one or several metal ion solutions used in the contacting step contains a chelating agent.

10. Method according to claim 4, wherein the layer of porous aluminium oxide is contacted with a mixed solution containing ions of europium as well as ions of the first and/or the second group.

11. Method according to claim 10, wherein the mixed solution contains ions of europium (Eu) at an initial concentration of at least 0.0001% of that of the ions of the first group.

12. Method according to claim 10, wherein the mixed solution contains ions of the second group at an initial concentration of at least 0.0001% of that of the ions of the first group.

13. Method according to claim 1, wherein the object as a whole is substantially made of aluminium or an aluminium based alloy.

14. Method according to claim 1, wherein the step of forming the layer of porous aluminium (hydr)oxide is carried out using an anodic oxidation process.

15. Method according to claim 10, wherein the anodic oxidation process is carried out using an electrolyte that also forms the mixed solution.

16. Method according to claim 1, further comprising:
   washing the layer of porous aluminium (hydr)oxide before contacting it with the one or several metal ion solutions.

17. Method according to claim 1, wherein the step of reducing europium ions is carried out after the step of contacting the layer of porous aluminium (hydr)oxide with the one or several metal ion solutions such as to reduce europium ions that has been bound to the layer of porous aluminium oxide during the contacting step.

18. Method according to claim 6, wherein the step of reducing europium ions is carried out after the step of sealing the layer of porous aluminium oxide.

* * * * *